March 14, 1967  A. P. BEDNARZ ET AL  3,308,502
SKINNING MACHINE
Filed June 16, 1965  5 Sheets-Sheet 4
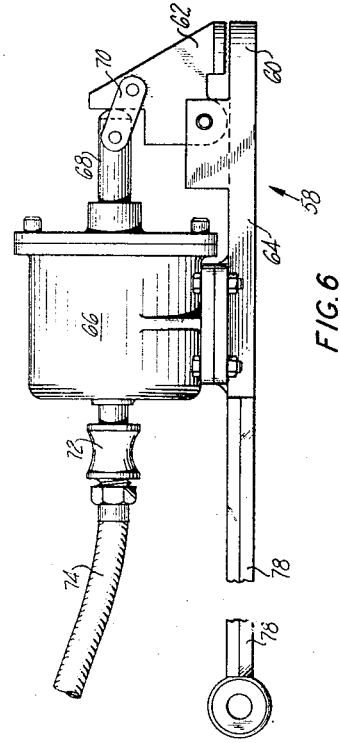
FIG. 6
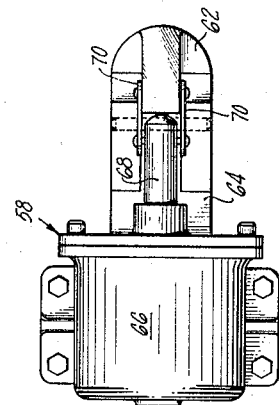
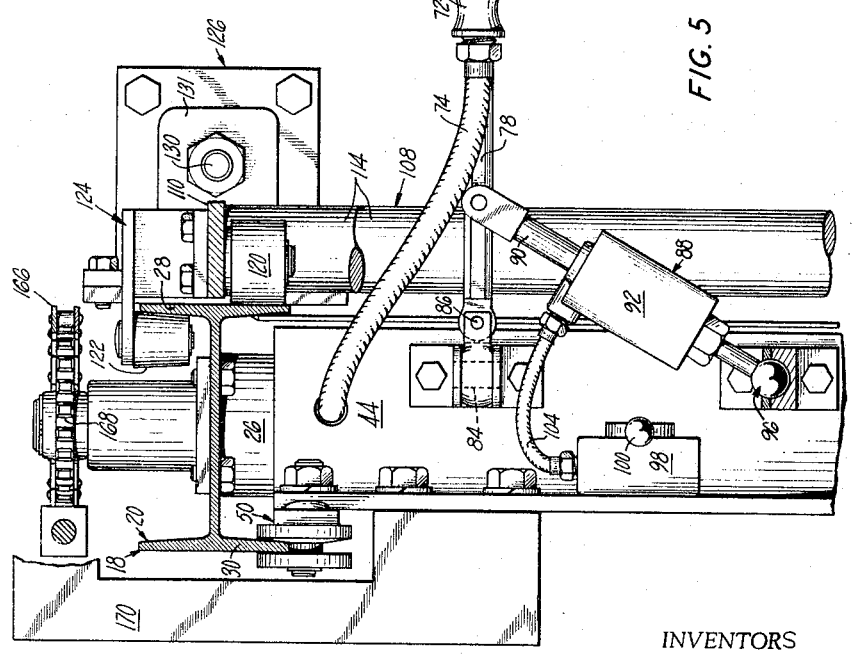
FIG. 5
INVENTORS
ANTHONY P. BEDNARZ
DAVID O. ROSER
BY Lindsey, Drutzman and Hayes
ATTORNEYS

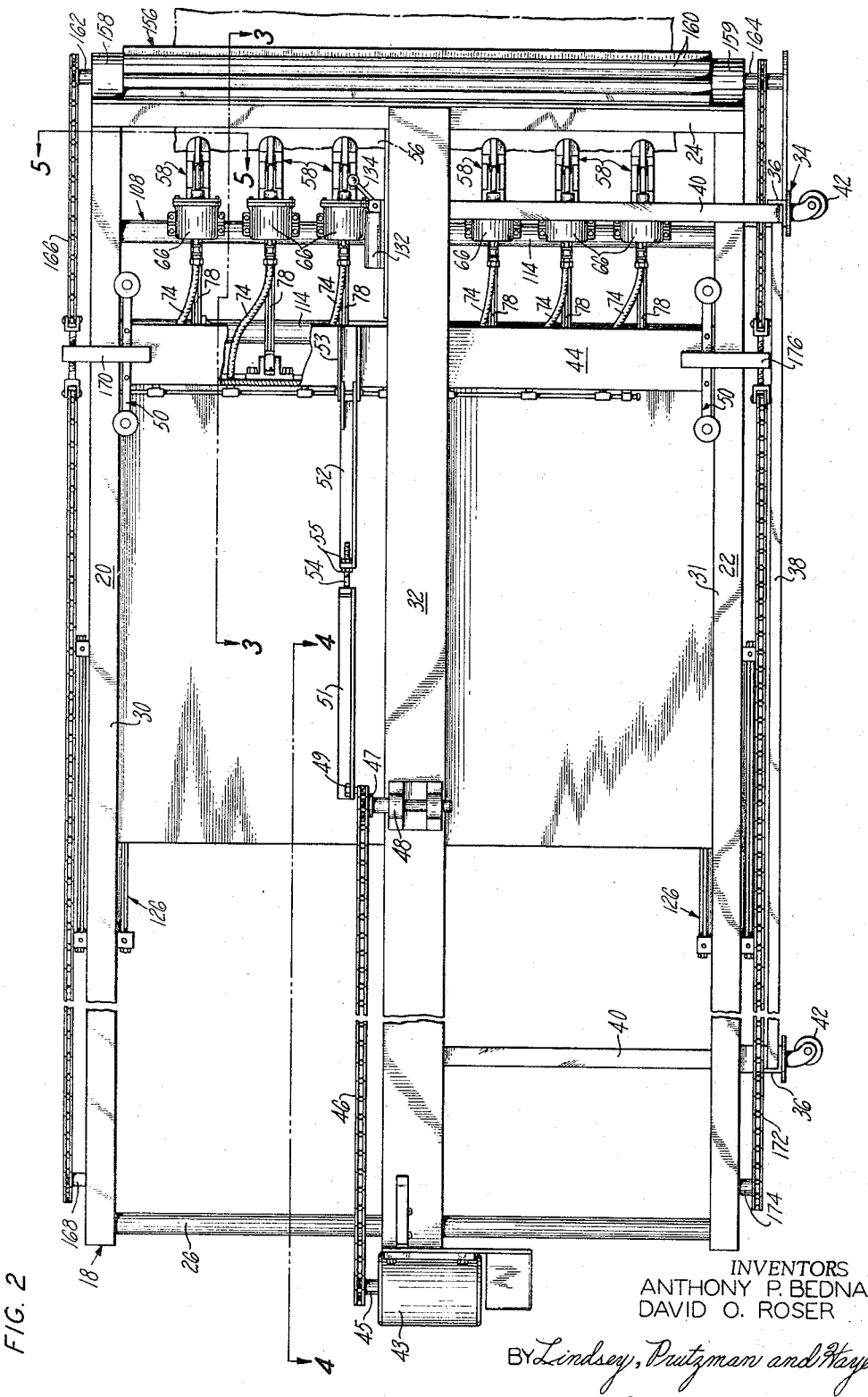

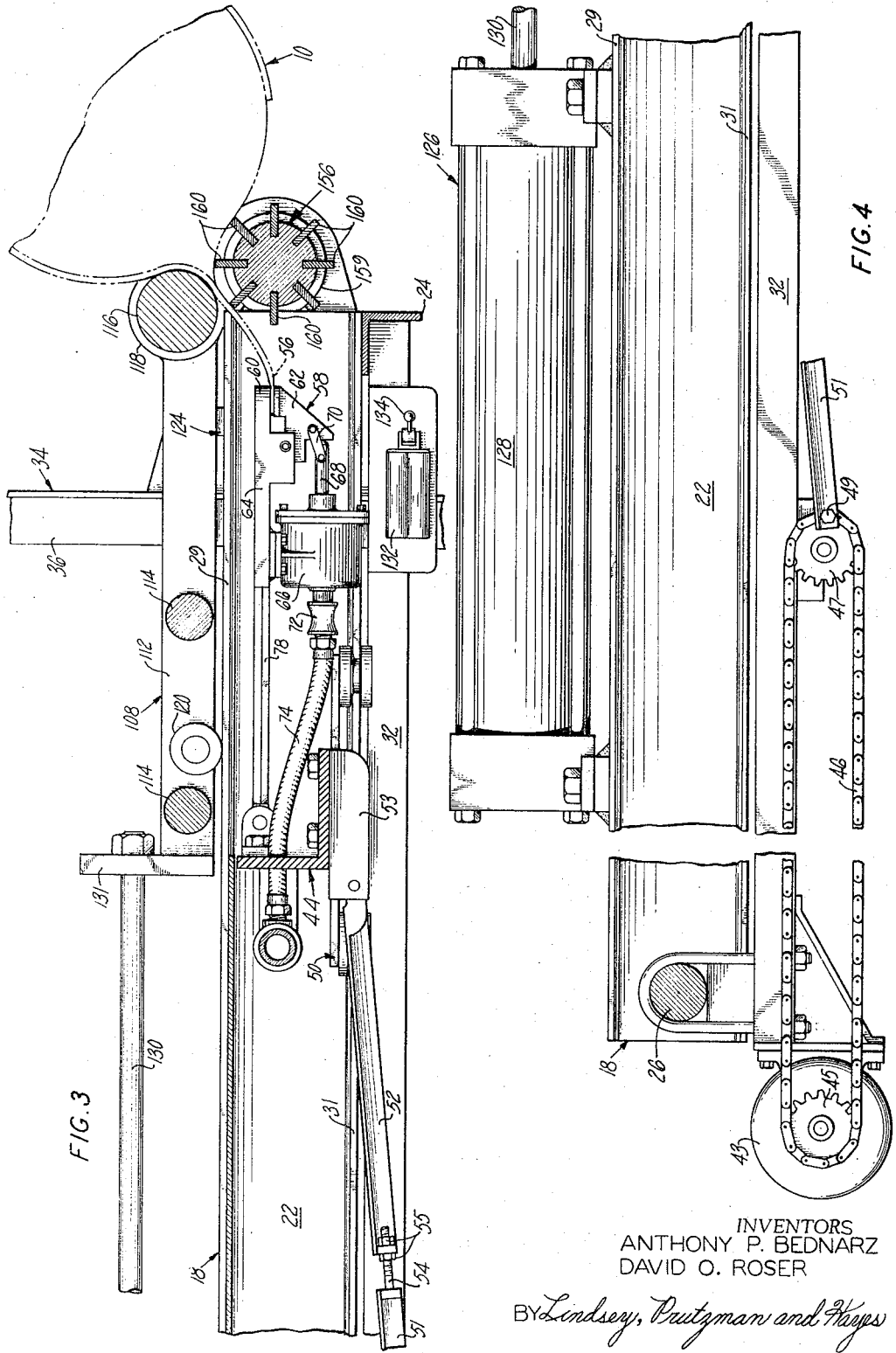

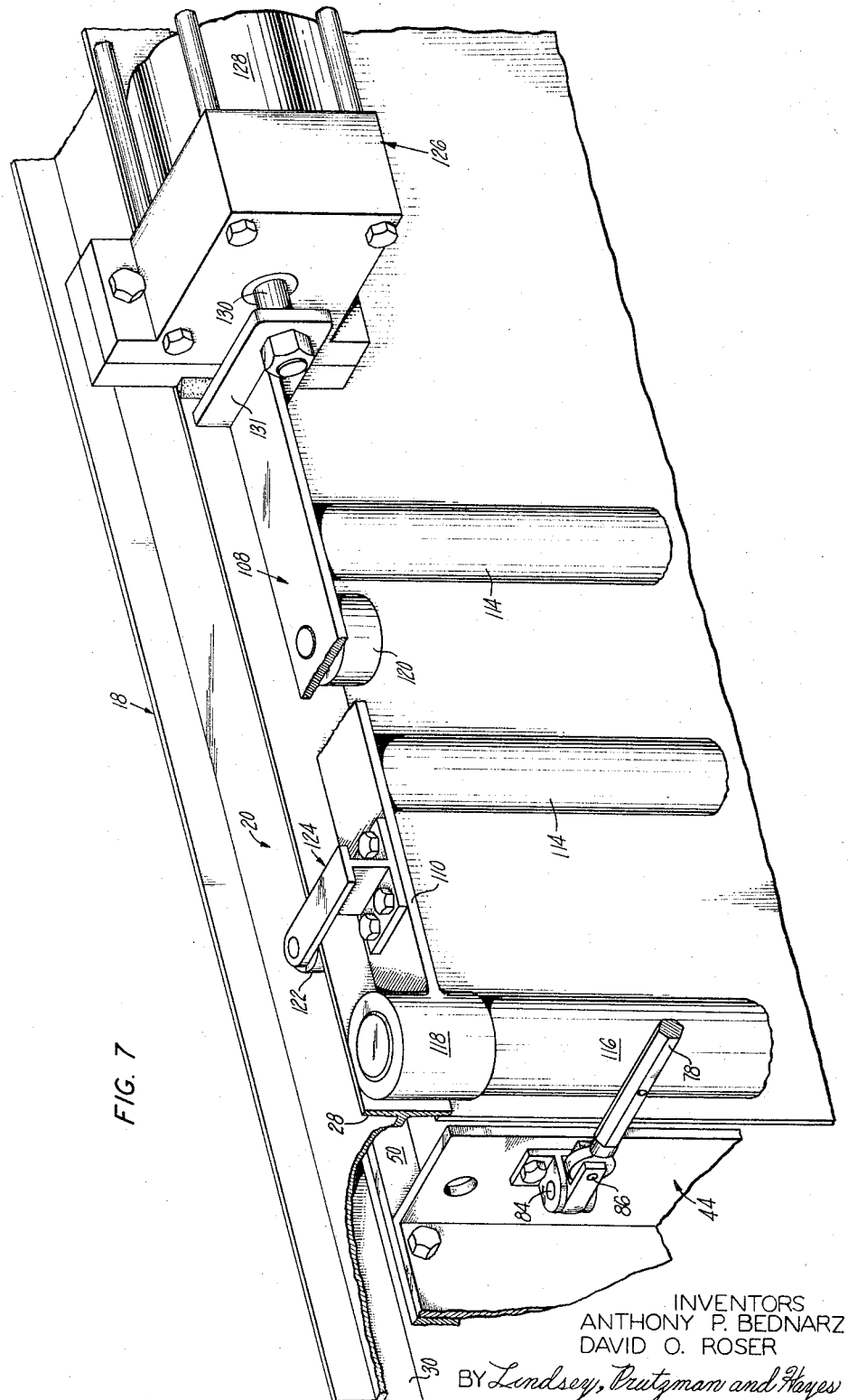

United States Patent Office 3,308,502
Patented Mar. 14, 1967

3,308,502
SKINNING MACHINE
Anthony P. Bednarz, East Hartford, and David O. Roser, Glastonbury, Conn., assignors to Allied Kid Company, Boston, Mass., a corporation of Massachusetts
Filed June 16, 1965, Ser. No. 464,331
16 Claims. (Cl. 17—21)

This invention relates to a skinning machine for removing hide from an animal carcass and more particularly to a machine for pulling hide from a carcass which is especially useful for skinning a variety of animals having strongly adhering hides particularly difficult to separate from the adhering fatty portions of the animal.

It is an object of this invention to provide an improved skinning machine of the type preferred to possessing exceptionally simple operating characteristics readily adapted to be commercially used in a slaughter house or the like. Included in this object is the aim of providing an improved skin separating device which is simple and economical to construct, but rugged, and is particularly effective in readily removing hide from a carcass in an efficient high speed operation.

Another object is to provide an improved clamping device forming a part of the machine for compressively gripping a flap of the hide securely without piercing or damaging the same and which is effective in preventing slippage, even though the carcass has an exceedingly strongly adhering hide to be removed by a pulling operation, and which can be adjusted to compensate for various sizes of carcasses to be skinned.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 2 is a side view of the machine opposite the side adjacent the carcasses;

FIG. 3 is an enlarged fragmentary longitudinal sectional view along line 3—3 of FIG. 2 with a carcass, shown in phantom, positioned at the front end of the machine;

FIG. 4 is an enlarged fragmentary longitudinal sectional view taken along line 4—4 of FIG. 2;

FIG. 5 is an enlarged cross-sectional view, partly broken away, along line 5—5 of FIG. 2;

FIG. 6 is a fragmentary enlarged side view of a clamp used in the practice of this invention; and FIG. 7 is a fragmentary isometric view, partly broken away, illustrating a roller assembly incorporated in this invention.

Figure 1:
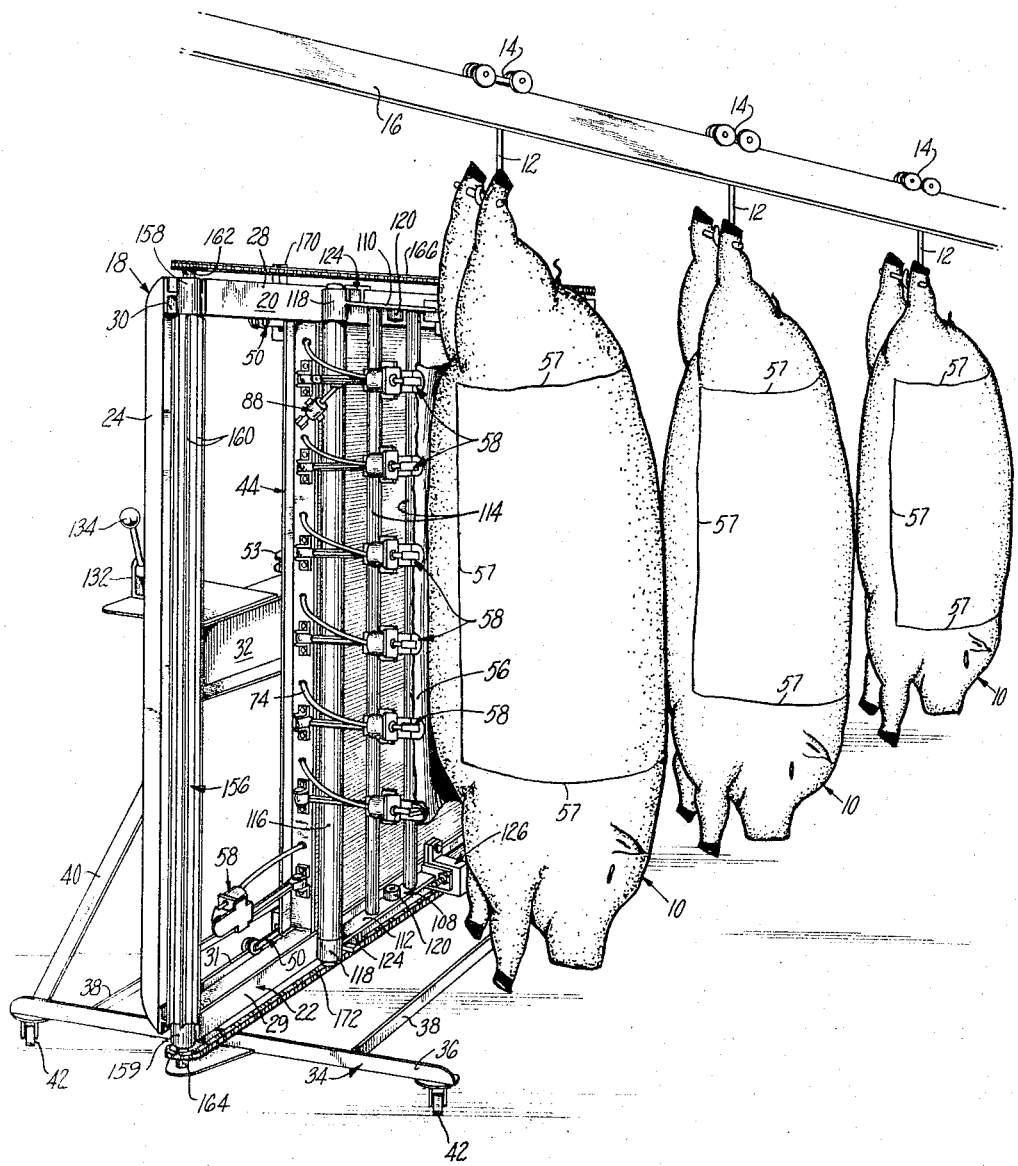
FIG. 1 is a perspective view of the machine incorporating this invention in association with carcasses suspended adjacent one side of the machine.

Briefly stated, the invention is embodied in a machine, to be described more specifically hereinafter, which is mounted on a portable frame for disposition immediately adjacent a suspended animal carcass and having clamping means for engaging an end flap of the hide portion which is to be separated in a circumferential manner from the suspended carcass. After the clamps are attached, the machine is actuated to cause the end flap to be disposed between a pair of vertically extending rolls at the forward end of the machine which conditions the machine for a hide separating operation. The one of the rolls which is in engagement with the fleshy side of the hide is provided with longitudinally extending cutting and scraping blades and is power driven in a counter direction as the clamping means is power driven in a direction away from the rolls to pull the hide between the rolls and separate the hide from the carcass.

Referring now to the drawings, a skinning machine embodying this invention is illustrated in FIG. 1 as mounted adjacent carcasses 10, those of pigs shown by way of example, held by hooks 12 revolvably mounted on trolleys 14 movable along an overhead horizontal rail 16. Frame 18 of the machine generally comprises an upper guide rail 20 and a lower guide rail 22 in spaced horizontal parallel relationship joined at the front end of the frame 18 by an upright angle support 24 and at the rear end of the frame 18 by an upright rod support 26. Both the upper and lower guide rails 20, 22 are of generally H-shape cross section to provide side flanges 28 and 29, respectively, on the side of the frame 18 adjacent the carcasses 10 and side flanges 30 and 31, respectively, on the opposite side of the frame 18. A center reinforcing beam 32 is horizontally disposed between the upper and lower guide rails 20, 22 in parallel relationship thereto. The above-described frame 18 is mounted upon a substantially rectangular carriage base 34 comprising a pair of cross members 36 and connecting bars 38 disposed therebetween, the cross members 36 having castors 42 fixed thereto to render the machine movable and portable. Braces 40 extend between the cross members 36 and frame 18 to impart additional vertical rigidity.

A drawbar 44 having an L-shape cross section extends vertically between the upper and lower guide rails 20, 22 and is supported and guided for movement along the upper and lower guide rails 20, 22 by trolleys 50, secured at each end of drawbar 44 and engaging the inner edges of the upper and lower flanges 30 and 31.

The drawbar 44 is power operated by an electric motor 43 mounted at the end of the center beam 32. The electric motor 43 is provided with a drive sprocket 45 engaging an endless chain 46, the endless chain 46 being supported by the drive sprocket 45 and by an idler sprocket 47 mounted on the center beam 32 intermediate its ends at a journal 48. The endless chain 46 is connected to the drawbar 44 by means of a pair of connecting bars 51 and 52, the connecting bar 51 being pivotally connected to one of the links of the endless chain 46 by a bolt 49 and the connecting bar 52 being pivotally connected to a bracket 53 bolted to the drawbar 44. The connecting bars 51 and 52 are adjustably connected together by a bolt 54 and lock nuts 55. By this arrangement, the drawbar 44 may be advanced and retracted with a reciprocating motion by a unidirectional motor 43. Manual switching means (not shown) may be used to initiate operation of the electric motor 43, and limit switches (not shown) engageable by the drawbar 44 at the extremes of its movement may be used to de-energize the motor so that the drawbar 44 will be automatically halted at each extreme of movement.

As previously indicated, the carcass 10 which is vertically suspended from the overhead rail 16 is initially positioned as seen in FIG. 1 between the ends of the frame 18. The carcass 10 is precut as indicated along the lines 57 and a longitudinal hide flap 56 is raised from the carcass 10. A uniformly distributed hold on the flap 56 is attained by providing a plurality of clamps 58 positioned on the drawbar 44 in vertically spaced relationship so as to grip the flap 56 in preparation for removal of the hide from the carcass 10. Seven equally spaced clamps 58 are illustrated in the preferred embodiment. As best seen in FIGS. 5 and 6, each clamp 58 generally comprises a stationary jaw 60 at the forward end of a mounting plate 64 and a cooperating movable jaw 62 pin-connected thereto. An actuating cylinder 66, which is shown as a standard air cylinder, is mounted on the plate 64 for operating a piston rod 68 connected by links 70 to the movable jaw 62. Compressed air from an external source, not shown, is received by the cylinder 66 through a flexible hose 74 leading to a conventional two-way valve 72. When the valve 72 is actuated to introduce air to the actuating cylinder 66, the piston rod 68 is thrust forward against the movable jaw 62 to provide an excellent gripping action for compressively engaging the flap 56. The jaws 60, 62 are readily released by moving the valve 72 in the opposite direction to relieve the air pressure within the actuating cylinder 66.

Each clamp 58 is connected to the drawbar 44 by an arm 78 pivotally mounted on the drawbar 44 whereby the clamp 58 may be swung in a horizontal plane from the loading position, shown in FIG. 1, to a position extending toward the front end of the frame 18, as shown in FIG. 3, prior to the pulling operation.

So that the previously described clamping arrangement may compensate for a variety of carcass sizes to be skinned, the arm 78 of top clamp 58, for example, is connected to the drawbar 44 for both vertical and horizontal pivotal movement, this connection being provided by the two pivots 84 and 86. A positioning device 88 is illustrated in FIG. 5 for maintaining the top clamp 58 in adjusted position, the positioning device 88 acting as an air cushion. A piston rod 90 extending from the air cylinder 92 is pivotally connected at one intermediate of the ends of the arms 78. The cylinder 92 is mounted on the drawbar 44 by a ball joint 96 which permits swinging movement in any direction. Pressurized fluid, such as compressed air from an external source, not shown, is admitted to the cylinder 92 by hose 104 and is controlled by a suitable valve 98. The clamp 58 may be moved manually against the pressure of the air in cylinder 92 to adjusted position. Although not utilized in the specific embodiment shown in the drawing, a similar adjusting arrangement may also be used on the bottom clamp 58 or any of the other clamps, if desired, to provide further compensation for variations in carcass sizes.

After the plurality of clamps 58 have been secured to the flap 56 of the carcass 10 adjacent the frame 18 as shown in FIG. 1, which can be easily and conveniently done manually in view of the ready acessibility of the clamps 58 to the carcass 10 which facilitates this operation, the skinning machine and carcass 10 are then moved relative to each other so as to dispose the carcass 10 at the front end of the machine in a hide-separating position as shown in FIG. 3 with the clamps 58 extending generally parallel to the frame 18. This is accomplished by means of a positioning carriage 108 best seen in FIGS. 1, 3 and 7. The positioning carriage 108 generally comprises a frame consisting of an upper support plate 110 and a lower support plate 112 in horizontal spaced relationship connected by vertical bars 114. A pressure or idler roll 116 is supported for rotation on the frame by bearing members 118, one shown as being fixed to the extreme forward end of the upper support plate 110 and the other fixed in a similar position on the lower support plate 112. The entire positioning carriage 108 is mounted for rolling movement along the side flanges 28 and 29 of the upper and lower guide rails 20, 22 by means of similar roller assemblies at the top and bottom, the top roller assembly being shown in detail in FIGS. 5 and 7. Roller 120 is mounted underneath the upper support plate 110 for rolling engagement with the outer face of the flange 28 while a tapered roller 122, in rolling engagement with the inner face of the flange 28 is mounted above the upper support plate 110 by means of a bracket 124. A similar assembly is mounted in an inverted position upon the lower support plate 112 for engagement with the inner and outer faces of flange 29.

The positioning carriage 108 is illustrated in the drawings as being actuated by air motors 126, one being mounted on the upper guide rail 20 operative with the upper support plate 110, and the other being mounted on the lower guide rail 22 and operative with the lower support plate 112 of the positioning carriage 108. The air motors 126, which are operated by an external compressed air source, not shown, each comprise an air cylinder 128 rigidly secured in horizontal position to the guide rail and a piston rod 130 connected to a thrust plate 131 mounted at the extreme rearward end of each of the upper and lower support plates 110 and 112. The compressed air is controlled by a conventional two-way valve 132 operated by a lever 134. Upon moving the lever 134 in one direction, compressed air enters the rear end of both the upper and lower air cylinders 128 causing the upper and lower piston rods 130 to advance whereby the entire positioning carriage 108 is rolled forward so that the idler roll 116 is positioned as in FIG. 3 at the extreme front end of the frame 18. Similarly, by actuating lever 134 in the opposite direction, the positioning carriage 108 may be power-returned to the original loading position with the piston rods 130 fully retracted within the air cylinders 128 as seen in FIG. 1. During the loading, the drawbar 44 to which the clamps 58 are attached is in the advanced or forward position. When the positioning carriage 108 is moved forwardly to the position shown in FIG. 3, the idler roll 116 by engaging the arms 78 of the clamps 58 pivots all of the clamps 58 so that they extend toward the front of the frame 18, thus simultaneously positioning the carcass 10 at the front of the machine in preparation for the removal of the hide.

A vertical first roll, or cutter and scraper roll 156 is rotatably mounted at the front end of the frame 18 in the upper and lower bearings 158 and 159 fixed to the upper and lower guide rails 20, 22, respectively. The cutter and scraper roll 156 is located so that when the carcass 10 is moved to the front of the machine by advancement of the positioning carriage 108, the carcass 10 will be engaged against the scraper roll 156 while the flap 56 gripped by the clamps 58 will be disposed between the scraper roll 156 and idler roll 116, the fleshly side of the flap 56 being toward the scraper roll 156 and being pressed into firm engagement therewith by the idler roll 116 by reason of the pressure exerted against the positioning carriage 108 by air motors 126.

The cutter and scraper roll 156 is provided with a plurality of cutting and scraping blades 160, as best seen in FIG. 3, which project radially in equally spaced relationship from the periphery of the scraper roll 156 and extend longitudinally throughout the length thereof. The blades 160 may be made integral with scraper roll 156 but preferably are formed of individual steel strips embedded in longitudinal slots in scraper roll 156. The outer edges of the blades 160 are not sharpened but are preferably left with square, blunt ends as best shown in FIG. 3 of the drawings.

The scraper roll 156 is driven by sprockets 162 and 164 fixed to the upper and lower ends of the roll 156, respectively, whereby the upper roll sprocket 162 is engaged by a chain 166 which extends around idler sprocket 168 mounted at the opposite end of the upper guide rail 20, the ends of the chain 166 being secured to an arm 170 fixed to the upper end of the drawbar 44. Similarly, the lower roll sprocket 164 is engaged by a chain 172 extending around idler sprocket 174 mounted at the opposite end of the lower guide rail 22, the ends of chain 172 being secured to an arm 176 fixed to the lower end of the drawbar 44. Consequently, when the drawbar 44 is retracted by the motor 43, the chains 166 and 172 will be actuated thereby to cause simultaneous rotation of the scraper roll 156, the direction of rotation of the scraper roll 156 being such that the direction of movement of the cutting and scraping blades 160 in contact with the fleshy side of the hide will be opposite or counter to the direction of movement of the hide as it is drawn past the scraper roll 156 by the drawbar 44.

While it is believed that the operation of the machine will be apparent from the foregoing description, the following brief summary of operation may be helpful in fully understanding the invention. As previously mentioned, the machine of the present invention in the original loading condition is as shown in FIG. 1 with the drawbar 44 in an advanced position and the positioning carriage 108 in a retracted position, thus rendering the clamps 58 readily available for attachment to end flap 56 which has been partially separated from the carcass 10. After the clamps 58 are individually attached to the flap 56, the air motors 126 are energized to move the positioning carriage 108 forwardly thereby placing the carcass 10 at the front of the machine with the flap 56 extending between the cutter and scraper roll 156 and the idler roll 116, the machine then being in condition for a hide pulling operation. Thereupon, the motor 43 is energized to retract the drawbar 44 which, by reason of the clamps 58 attached to the flap 56 of the hide, will draw the same between the rolls 156 and 116 and at the same time the cutter and scraper roll 156 will be driven in a counter direction thereby insuring a clean and rapid separation of the hide 56 from the carcass 10. After the hide 56 has been completely pulled from the carcass 10 and past the rolls 156 and 116, the same is released by releasing the clamps 58, which can be accomplished automatically if desired, whereupon the positioning carriage 108 may be returned to the original position thus conditioning the machine for a repeat operation.

The machine of the present invention has been found to be particularly effective for the separation of hides from a variety of carcasses having strongly adhering fatty portions, and the machine is capable of rapid operation without breakdown or failure over long periods of operation, whereby hides of good quality and reduced cost may be produced in large volume.

As will be apparent to persons skilled in the art, various modifications and adaptations of the structure above described will become readily apparent without departure from the spirit and scope of the invention, the scope of which is defined in the appended claims.

We claim:

1. In an apparatus for removing a hide from a carcass, hide separating means comprising a first roll having longitudinally extending blades thereon and a pressure roll parallel to the first roll, said rolls being adapted to receive a hide flap of a carcass therebetween with the carcass abutting the rolls, pulling means having means for attachment to a hide flap for pulling the hide flap through the rolls, and means for rotating the first roll in a direction such that the blades engaging the hide move in a direction opposite to the direction of movement of the hide as it is pulled by said pulling means.

2. An apparatus for removing a hide from a carcass comprising a roll supported for rotation having blade means thereon extending longitudinally thereof, clamping means for attachment to a hide flap of a carcass, pressure means for pressing the hide flap against the roll with the fleshy side of the hide immediately adjacent the roll, means for pulling the clamping means away from the roll, and means for simultaneously rotating the roll in a direction such that the movement of the blade means when in contact with the hibe is opposite to the direction of movement of the clamping means and hide.

3. An apparatus for removing a hide from a carcass comprising a scraper roll supported for rotation having a plurality of longitudinally extending blades, clamping means for attachment to a hide flap of a carcass and mounted for movement toward and away from the scraper roll, a pressure roll for pressuring the hide against the roll with the fleshy side of the hide in contact with the scraper roll, power means for drawing the clamping means away from the scraper roll, and means for simultaneously rotating the scraper roll in a direction such that the movement of the blades when in contact with the hide is opposite to the direction of movement of the clamping means and hide.

4. An apparatus for removing a hide from a carcass comprising a frame, a roll having blade means extending longitudinally thereof mounted for rotation on the frame, clamping means for attachment to a hide flap of a carcass, said clamping means being mounted on the frame for movement toward and away from the roll, driving means for moving the clamping means away from the roll, pressure means for pressing a hide flap secured by said clamping means against the roll, said pressure means and roll being movable relative to each other, and means for rotating the roll in a direction such that the blade means thereon when in engagement with a hide moves in a direction opposite to the direction of movement of a hide pulled past said roll by the clamping means.

5. An apparatus for removing a hide from a carcass comprising a frame, a pair of rolls rotatably supported in parallel relationship on said frame, one of said rolls having thereon a plurality of blade edges for separating the hide from a fatty layer on the carcass and for scraping the fleshy side of the hide as it passes between said rolls, clamping means on said frame for gripping a hide flap interposed between said rolls, said clamping means being mounted for movement toward and away from said rolls, driving means for moving said clamping means away from said rolls and simultaneously rotating said one of said rolls in a direction such that the direction of movement of said blade edges when in engagement with the fleshy side of the hide is in a direction opposite to the direction of movement of the clamping means and hide secured thereto.

6. An apparatus for removing a hide from a carcass comprising a frame, a first roll having a plurality of blades extending longitudinally thereon, a second roll mounted on the frame for movement toward and away from the first roll with its axis generally parallel to the axis of the first roll, hide pulling means mounted on the frame for movement toward and away from the first roll having clamping means for attachment to a hide flap extending between the rolls with the fleshy side of the hide toward the first roll, power means for moving the hide pulling means away from the first roll, and means responsive to operation of the power means for simultaneously rotating the first roll in a direction such that the blades engaging the hide move in a direction opposite to the direction of movement of a hide being pulled by said pulling means.

7. An apparatus for removing a hide from a carcass comprising a frame having a pair of guide rails in parallel spaced relationship, a first roll rotatably supported adjacent one end of said guide rails, said first roll having thereon a plurality of blades extending longitudinally in spaced relationship in the periphery of said first roll, an idler roll rotatably supported in parallel relationship with said first roll and being mounted for movement along said guide rails toward and away from said first roll, power means for moving said idler roll along said guide rails and for retaining said idler roll in close proximity to said first roll as a hide is drawn between said rolls, means for rotating said first roll, and hide clamping means mounted on said guide rails for movement away from said rolls for pulling the hide from the carcass between said rolls in a direction opposite to the tangential direction of movement of said blades when they are in engagement with the hide.

8. An apparatus for removing a hide from a carcass comprising a frame, a first roll mounted in vertical position on the frame adjacent one end thereof, said first roll having a plurality of blade edges thereon, a drawbar mounted on the frame generally parallel to the first roll for movement toward and away from the first roll, a hide clamping means mounted on the drawbar, and idler roll mounted on the frame for movement toward and away from the first roll for pressing a hide engaged by said clamping means against the first roll, power means for advancing the idler roll toward the first roll and for moving the drawbar away from the first roll, and driving means for rotating the first roll during movement of the drawbar away from the first roll, the direction of rotation of the first roll being such that the blades thereon when engaging the hide move in a direction opposite to the direction of movement of the hide.

9. An apparatus for removing a hide from a carcass comprising a frame, a pair of horizontal guide rails mounted in spaced relationship on the frame, a first roll mounted in vertical position on the frame adjacent one end of the guide rails, said first roll having a plurality of longitudinally extending blades thereon, hide clamping means mounted on the guide rails for movement toward and away from the first roll, a pressure roll mounted on the guide rails for movement toward and away from the first roll for pressing a hide engaged by said clamping means against the first roll, means for advancing the pressure roll toward the first roll and for moving the clamping means away from the first roll, and driving means for rotating the first roll at a predetermined speed relative to that of the clamping means during movement of the clamping means away from the first roll, the direction of rotation of the first roll being such that the blades thereon when engaging the hide move in a direction opposite to the direction of movement of the hide.

10. An apparatus for removing a hide from a carcass comprising a frame, a pair of horizontal guide rails mounted in spaced relationship on the frame, a first roll mounted in vertical position on the frame adjacent one end of the guide rails, said first roll having a plurailty of longitudinally extending blades of rectangular cross section thereon, a drawbar mounted on the guide rails generally parallel to the first roll for movement toward and away from the first roll, hide clamping means on the drawbar for holding a hide flap of a carcass, a positioning carriage mounted on the guide rails for movement toward and away from the first roll, said positioning carriage having an idler roll thereon for pressing a hide engaged by said clamping means against the first roll, power means for advancing the positioning carriage toward the first roll and for moving the drawbar away from the first roll, and driving means for rotating the first roll during movement of the drawbar away from the first roll, the direction of rotation of the first roll being such that the blades thereon when engaging the hide move in a direction opposite to the direction of movement of the hide.

11. An apparatus for removing a hide from a carcass comprising a frame, said frame including a pair of guide rails in parallel spaced relationship supported by a carriage base, a first roll supported for rotation at one end of said guide rails, a power-operated positioning device movably mounted upon said guide rails for movement toward and away from said first roll, an idler roll supported for rotation on said positioning device in parallel relationship with said first roll, a drawbar mounted upon said guide rails for movement toward and away from said first roll, a plurality of clamps pivotally mounted in spaced relationship upon said drawbar, each of said clamps having means for gripping a hide flap of a carcass, a power-operated mechanism for moving said drawbar away from said rolls, and means for simultaneously rotating said first roll in a direction whereby the tangential direction of movement of said blade edges when they are in contiguous engagement with the fleshy side of the hide is opposite to the direction of movement of the hide.

12. An apparatus for removing a hide from a carcass comprising a frame, said frame including a pair of guide rails in parallel spaced relationship, a first roll rotatably supported on said guide rails at one end of said frame, said first roll having thereon a plurality of blade edges extending longitudinally in spaced relationship in the periphery of said first roll, an idler roll supported for rotation in parallel relationship with said first roll, said idler roll being mounted for movement along said guide rails toward and away from said first roll, power means for moving said idler roll along said guide rails and for pressing said idler roll against a hide as it passes between said rolls, a drawbar in parallel relationship with said first roll, said drawbar mounted upon said guide rails for movement toward and away from said first roll, a plurality of clamps mounted upon said drawbar in spaced relationship for gripping a hide flap interposed between said rolls, and driving means for moving said drawbar away from said rolls and simultaneously rotating said first roll in a direction such that the hide from the carcass is pulled between said rolls in a direction opposite to the tangential direction of movement of said blade edges when they are in contiguous engagement with the fleshy side of the hide.

13. An apparatus for removing a hide from a carcass comprising a portable frame, a pair of horizontal guide rails mounted in spaced relationship on the frame, a first roll rotatably mounted in vertical position on the frame adjacent one end of the guide rails, said first roll having a plurality of longitudinally extending blades thereon, a drawbar mounted on the guide rails generally parallel to the first roll for movement toward and away from the first roll, a plurality of spaced apart arms each pivotally connected at one end to the drawbar and having hide clamping means at its outer end, a positioning carriage mounted on the guide rails for movement toward and away from the first roll, said positioning carriage having an idler roll thereon for pressing a hide engaged by said clamping means against the first roll, power means for advancing the positioning carriage toward the first roll and for moving the drawbar away from the first roll, and driving means actuated by said drawbar for rotating the first roll during movement of the drawbar away from the first roll, the direction of rotation of the first roll being such that the blades thereon when engaging the hide move in a direction opposite to the direction of movement of the hide.

14. An aparatus as set forth in claim 13 wherein said hide clamping means comprises a fixed jaw and a movable jaw, power means for actuating the movable jaw, and control means for energizing the power means of each of said hide clamping means individually.

15. In an apparatus for removing a hide from a carcass, clamping means for the hide comprising a plurality of clamps, each having a mounting plate, a stationary jaw extending from one end of said mounting plate, a movable jaw pivotally connected at said one end of said mounting plate to said stationary jaw, an actuating cylinder fixed to said mounting plate, a piston rod operated by said cylinder for closing and opening said movable jaw upon said stationary jaw as said rod is advanced or retracted by said cylinder, an elongated arm fixed at one end to the other end of said mounting plate, and means at the other end of said arm for pivotally mounting the clamp upon a movable supporting member.

16. In an apparatus for removing a hide from a carcass, hide separating means, a drawbar mounted for movement away from the hide separating means, and clamping means for securing a hide flap to the drawbar comprising a plurality of arms spaced longitudinally of the drawbar, each arm being pivotally secured at one end to the drawbar and having an individual clamp at its outer end, and means for positioning at least one of the outermost arms in selected angular position relative to the drawbar comprising an extensible and retractable supporting member extending between the drawbar and said one of the outer arms, and means for adjusting the length of said supporting member.

References Cited by the Examiner
UNITED STATES PATENTS

| | | | |
|---|---|---|---|
| 2,590,747 | 3/1952 | Birdseye | 17—21 X |
| 3,215,179 | 11/1965 | Schill | 146—130 |
| 3,249,139 | 5/1966 | Runnells et al. | 146—130 |

LUCIE H. LAUDENSLAGER, *Primary Examiner.*